United States Patent
Huang et al.

(10) Patent No.: US 11,831,182 B1
(45) Date of Patent: Nov. 28, 2023

(54) SYSTEM AND METHOD FOR IN-LINE WIRELESS ENERGY TRANSFER AND SENSING IN AN INDEPENDENT CART SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US); Robert H. Schmidt, Germantown, WI (US); Michaela R. Kaufmann, Chelmsford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/889,018

(22) Filed: Aug. 16, 2022

(51) Int. Cl.
| | |
|---|---|
| H02J 50/90 | (2016.01) |
| H02J 50/00 | (2016.01) |
| B65G 54/02 | (2006.01) |
| H02J 50/40 | (2016.01) |
| H02J 50/10 | (2016.01) |

(52) U.S. Cl.
CPC .............. *H02J 50/90* (2016.02); *B65G 54/02* (2013.01); *H02J 50/005* (2020.01); *H02J 50/10* (2016.02); *H02J 50/40* (2016.02)

(58) Field of Classification Search
CPC ...................................................... B65G 54/02
See application file for complete search history.

(56) References Cited

U.S. PATENT DOCUMENTS

| | | | |
|---|---|---|---|
| 6,191,507 B1* | 2/2001 | Peltier ................ | G01D 5/2451 |
| | | | 318/135 |
| 9,379,649 B2* | 6/2016 | Takase ................... | H02P 25/06 |
| 10,985,685 B1 | 4/2021 | Sun et al. | |
| 11,190,086 B2 | 11/2021 | Grosskreuz et al. | |
| 2020/0379439 A1 | 12/2020 | Klein, II | |
| 2021/0046826 A1 | 2/2021 | Prussmeier et al. | |
| 2021/0213984 A1 | 7/2021 | Cooper et al. | |
| 2022/0069754 A1* | 3/2022 | Muellerschoen .... | H02K 41/031 |

* cited by examiner

*Primary Examiner* — Daniel Kessie
(74) *Attorney, Agent, or Firm* — Boyle Fredrickson, SC

(57) ABSTRACT

An independent cart system provides a track assembly having a first, second, and third portion with the first and second portions providing drive coils mounted along the length of the track and flanking the second portion devoid of drive coils, the second portion providing an energy transfer coil. A plurality of movers operative to travel along the track, and have a drive member and a pick-up coil mounted for electrical interaction with the energy transfer coil when a given mover is aligned with a given second track portion. The first and second track portions include current drive circuits providing current to respective drive coils to generate electromagnetic fields which engages mover drive members to propel each movers along the track and the second track portion includes an energy transfer circuit providing current to the energy transfer coil to transfer electrical energy through mutual inductance to pick-up coils of the movers.

20 Claims, 4 Drawing Sheets

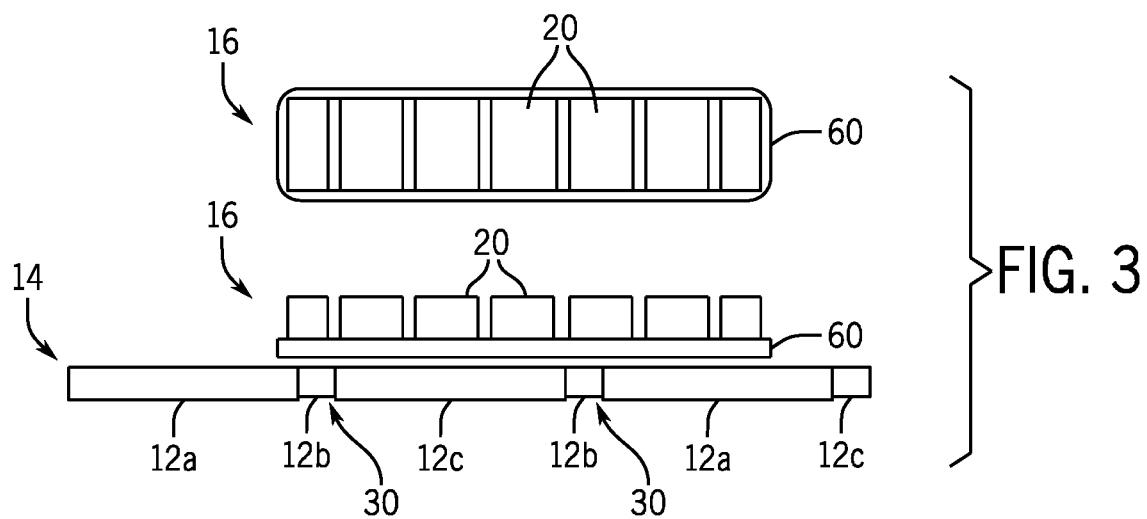
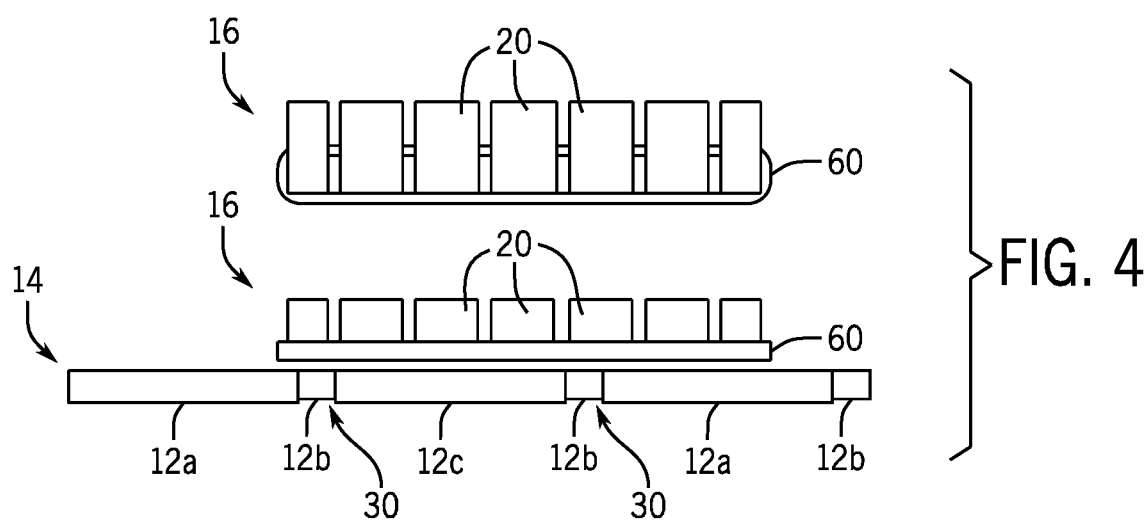

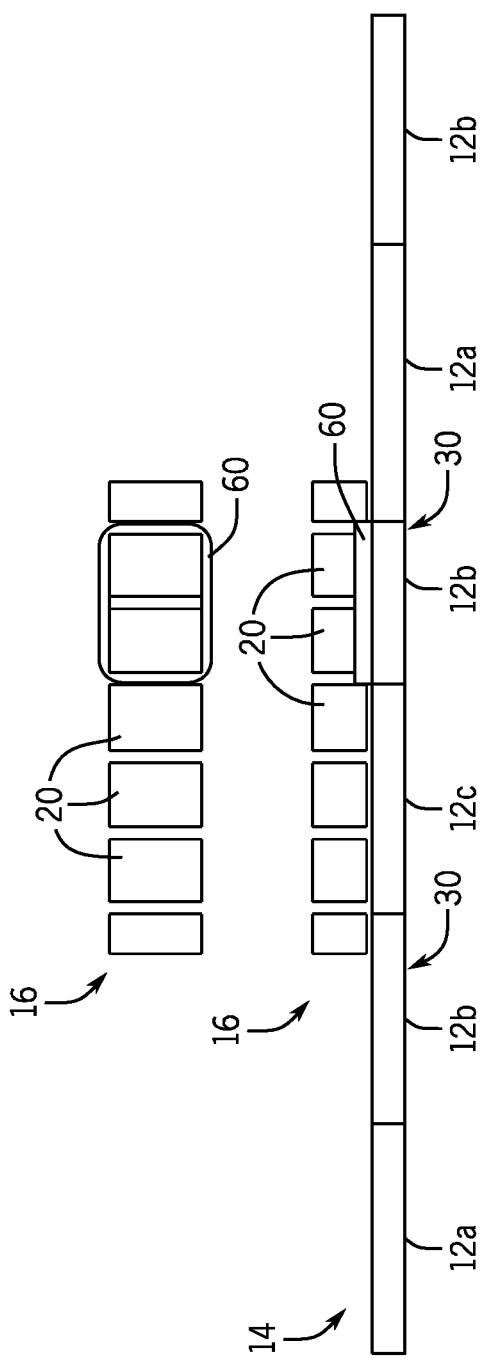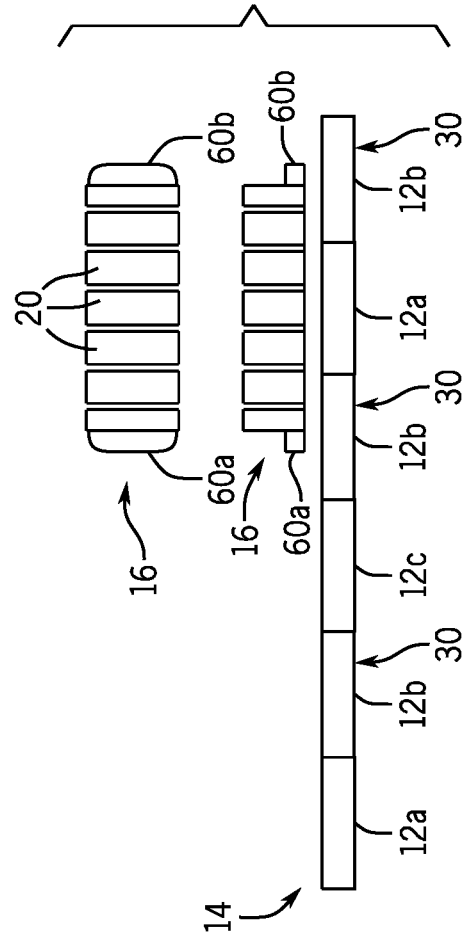

SYSTEM AND METHOD FOR IN-LINE WIRELESS ENERGY TRANSFER AND SENSING IN AN INDEPENDENT CART SYSTEM

BACKGROUND INFORMATION

The subject matter disclosed herein relates generally to independent cart technology (ICT) which provides rapidly positionable "movers" moving on the principles of a linear motor and providing a replacement for conventional conveyor belt-type systems, and in particular, the subject matter relates to a compact and low-cost system for wireless energy transfer and sensing in an ICT system.

ICT conveyors can be used in a wide variety of processes (e.g., packaging, manufacturing, and machining) and can provide an advantage over conventional conveyor belt systems with respect to enhanced flexibility, extremely high-speed movement, and mechanical simplicity. An ICT system may include a set of independently controlled "movers" each supported on a track for motion along the track. The track is made up of a number of track segments having drive coils that are activated to cause the movers to travel along the track. Sensors may be spaced at fixed positions along the track and/or on the movers to provide information about the position and speed of the movers.

Each of the movers may be independently moved and positioned along the track in response to an electromagnetic field generated by the linear drive system. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then returns to the loading station to receive another unit of the product.

In certain applications, it may be desirable to provide an actuator or a sensor on the mover to interact with the product on the mover. For example, a clamp may actuate to secure the product to the mover or a sensor may detect the presence of the product on the mover. However, the actuator or sensor requires an energy source to operate. Because a mover can travel over long distances, it is often not practical to provide a fixed connection, such as an electrical cable or pneumatic line to the mover. Rather, it may be necessary to provide a portable energy source such as a battery for electric actuators or sensors or a pressurized tank for a hydraulic or pneumatic actuator. However, the portable energy source adds weight and takes up space on the mover. Further, the portable energy source needs to be periodically recharged.

One solution for recharging portable energy sources is to provide a dedicated location along the track at which the energy is supplied. The mover stops at the dedicated location where a temporary connection to an energy source may be established. However, the mover must then wait for the portable energy source to be recharged before resuming operation.

U.S. Pat. No. 10,985,685, hereby incorporated by reference and assigned to the assignee of the present invention, describes a wireless energy transfer system in which the mover may extract electrical energy from harmonics of the magnetic field produced by the drive coils on the track, the drive coils normally serving only to propel the movers. Such a system addresses the challenge of integrating drive coils and energy transfer coils by allowing the drive coils to serve both purposes.

The above approach may not be desirable for applications where wireless transfer is not required. It would thus be desirable to provide a method and apparatus for wirelessly transmitting power between a track and independent movers in an ICT system as an optional add-on to a standard system.

BRIEF DESCRIPTION

According to one embodiment of the invention, an apparatus for wireless energy transfer in an independent cart system provides a track assembly having a first, second, and third portions, with the first and second portions providing drive coils mounted along the length of the track and flanking the second portion devoid of drive coils, the second portion providing an energy transfer coil. A plurality of movers operate to travel along the track, each of the plurality of movers having a drive member and a pick-up coil mounted for electrical interaction with the energy transfer coil when a given mover is aligned with a given second track portion. The first and second track portions include respective current drive circuits providing current to respective drive coils to generate electromagnetic fields which engage mover drive members to propel each mover along the track, and the second track portion includes an energy transfer circuit providing current to the energy transfer coil to transfer electrical energy through mutual inductance to pick-up coils of the movers.

According to another embodiment of the invention, an apparatus for wireless energy transfer in an independent cart system provides a track assembly having a track having drive coils mounted along the length of the track at a given periodicity, the drive coils extending laterally to define a drive coil width across the track with respect to the track and a gap portion along the track greater in length than the given periodicity and free from drive coils, the gap portion holding an energy transfer coil within the drive coil width. The apparatus further includes a plurality of movers operative to travel along the track, each of the plurality of movers having a drive member and a pick-up coil mounted for electrical interaction with the energy transfer coil during movement over the track. The track include drive circuits providing current to the drive coils to generate electromagnetic fields which engages mover drive members to propel each movers along the track and energy transfer circuits providing current to the energy transfer coil to transfer electrical energy through mutual inductance to pick-up coils of the movers.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 3 is a superimposed top phantom view of mover magnets and pick-up coil and a side elevational view of the mover and track in a first embodiment where the pick-up coil wraps around the magnets of the mover;

FIG. 4 is a figure similar to that of FIG. 3 showing an implementation where the pick-up coil is partially displaced to one side of the magnets of the mover;

FIG. 5 is a figure similar to that of FIGS. 3 and 4 wherein the pick-up coil on the mover is displaced to one end of the magnets to overlap only a single energy transfer coil on the track at a time; and FIG. 6 is a figure similar to that of FIGS. 3-4 showing pick-up coils on the mover displaced to the longitudinal ends of the movers to provide two paths of power conduction with independent energy transfer coils on the track;

Figure 1:
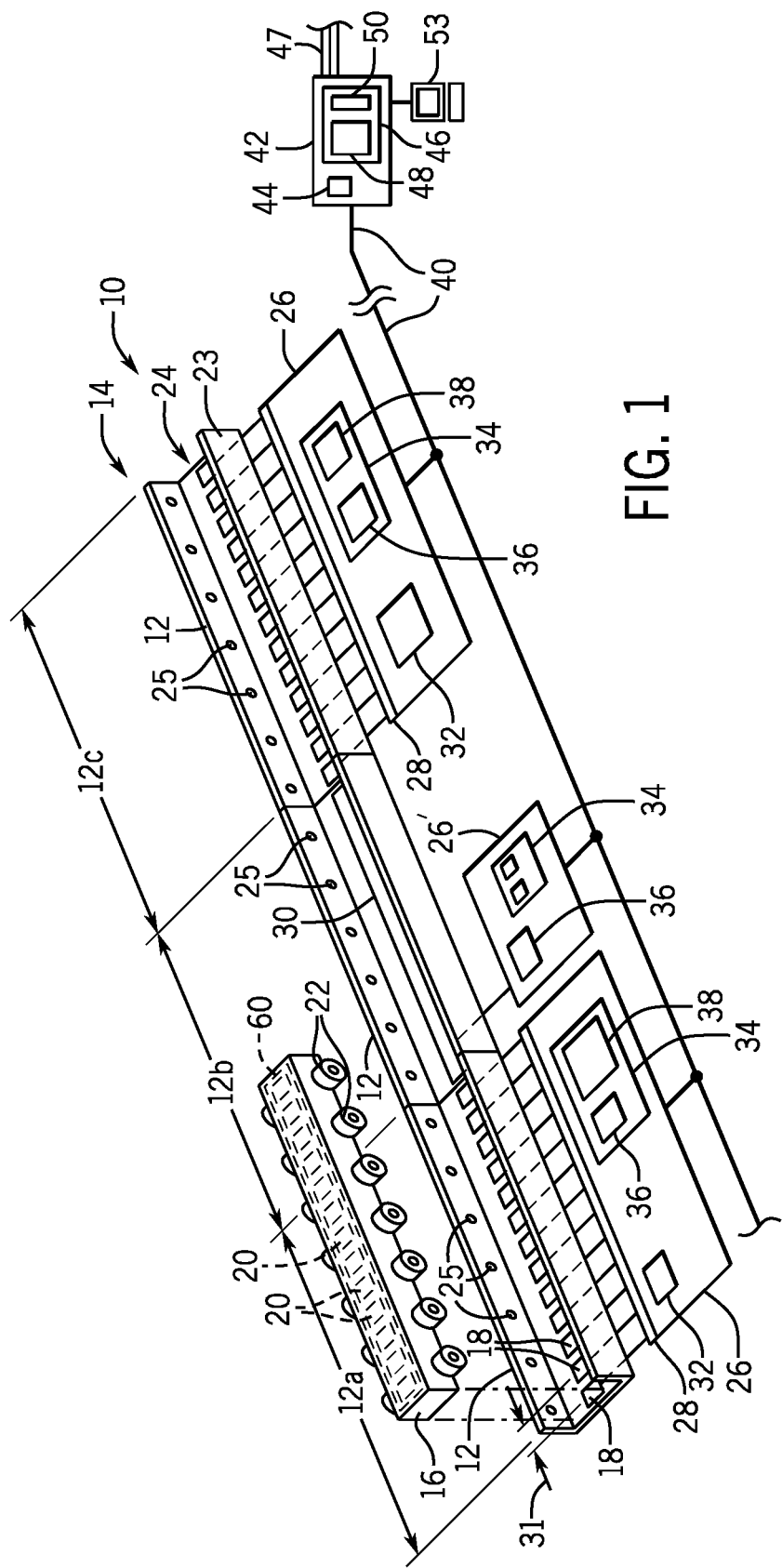
FIG. 1 is an exploded fragmentary perspective view of a simplified ICT system showing alternate track sections providing drive coils and energy transfer coils, the former sections associated with track processors sequencing the driver coils to control the position and motion of the movers and the latter section associated with a drive circuit driving at least one energy transfer coil.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The present invention recognizes the fact that the movers can span track portions having no driver coils so long as a portion of the mover's drive member engages some coils on other track portions to be held or moved by those drive coils. Accordingly, wireless transfer coils can be optionally provided on track sections between track sections holding such drive coils to allow wireless energy transfer to be provided while still employing standardized driving coil sections. Significantly, the wireless transfer can be provided in line with the track minimizing the track width such as could otherwise interfere with the associated process or manufacturing.

Referring now to FIG. 1, an independent cart technology (ICT) system 10 may provide a set of track segments 12a-12c including, for example, a first two segments 12a and 12c flanking a third track segment 12b as may be assembled in, one example, into a unified track 14, being part of a larger track system, for example, including loop switches and the like. In this regard the track segments 12 may provide for releasable mechanical fasteners such as bolts and the like and electrical connectors so that the track segments 12 provide modular elements that can be readily reconfigured. Generally this pattern of segments 12a or 12c separated from each other by a segment 12b may be continued throughout the track 14.

A set of movers 16 (only one shown for clarity) may be positioned on the track 14 to move there along, for example, as supported by rollers 22 held within a guide channel 24 of the track segment 12 so that the mover 16 is constrained laterally to stay on the track 14, for example, by retaining wall 23 of the guide channel 24.

Each of the track segments 12a and 12c will provide a stator of a linear motor having a set of electromagnetic driver coils 18 spaced along an extent of the track segment 12 interacting with a drive member being in one example permanent magnets 20 within the mover 16. Together the driver coils 18 and magnets 20 provide a linear motor so that the movers 16 may be moved or positioned by the selected energization of the driver coils 18. The permanent magnets 20 in the mover 16 may alternate and rotate in polarity to form a so-called Halbach array to better interact with the magnetic fields generated by the driver coils 18 which generally provide upwardly (as depicted) magnetic axes. For convenience, the invention will be discussed with respect to drive magnets 20 being used as the drive member within each mover 16. However, it is understood that the other magnetically salient structures such as electromagnets, electrical coils of conductive material, and ferromagnetic materials may be employed together with or replacing the magnets 20 without deviating from the scope of the invention.

In addition, each track segment 12 may include multiple sensors 25, for example, Hall effect sensors, magnetodiodes, an anisotropic magnetoresistive (AMR) device, fluxgate sensor, or other similar devices operating to generate an electrical signal corresponding to the presence of a mover 16, for example, sensing a magnetic field of the magnets 20. The sensors 25 allow the position of the mover 16 to be determined to provide for feedback control of the motion and positioning of the movers 16.

Each track segment 12a and 12c may be associated with a track controller 26 providing a set of electrical switches 28 for controlling the current to the driver coils 18 according to a desired sequencing of current through those driver coils 18 for moving or positioning the mover 16. As mentioned above, this sequencing may make use of the position information from the sensors 25 in a feedback loop and may implement precise motion profiles and collision detection under local control of the track controller 26. The electrical switches 28 may be solid-state switches, including, but not limited to, transistors, thyristors, or silicon-controlled rectifiers.

In order to properly sequence the switches 28 to move or position the mover 16, the track controller 26 may provide an electronic processor 32, for example, having one or more processing elements communicating with interface circuitry (not shown) providing signals to the switches 28 and receiving signals from the sensors 25 according to an operating program 36 and data files 38 held in electronic memory 34 and as will be further discussed below. Multiple track controllers (e.g., 26, 26') associated with different segments 12a or 12c may intercommunicate by a data bus 40, for example, ethernet, for the transmission of electronic data as will also be discussed in greater detail below.

The data bus 40 also connects the track controllers 26 with a central controller 42, for example, having one or more processors 44 communicating with an electronic memory 46 holding an operating program and application program 48 as well as various data files 50 for the configuration and supervision of the ICT system 10. The central controller 42 may also communicate with a user terminal 52 (for example, including a graphics display for output and a keyboard, mouse, or the like for input) to allow a programming and configuration of the ICT system 10 including, for example, development of the application program 48 dynamically defining the various destinations and starting points of the mover 16. In addition, the central controller 42 may receive position information from the sensors 25 as relayed by the track controllers 26 to monitor mover traffic and may provide programming rules and motion profiles to the track controllers 26 as will be discussed. In some embodiments, the central controller 42 may be a programmable logic controller (PLC) configured to also control other machines and devices associated with the manufacturing line employing the ICT system 10. This additional control may be conducted through I/O lines 47, for example, controlling actuators such as pneumatic or magnetic actuators, or motors and/or receiving additional sensor signals, for example, from limit switches, cameras, temperature monitors, and the like.

Elements of the above described independent cart technology suitable for use with the present invention are commercially available from Rockwell Automation, Inc. having offices throughout the world, for example, under the trade names of MagneMover and QuickStick, and are described in multiple US and international patents assigned to the assignee of the present application and hereby incorporated by reference including US patent applications 2021/0213984; and 2020/0379439; and U.S. Pat. Nos. 10,985,685 and 11,190,086.

Referring still to FIG. 1, track segment 12b will not include the driver coils 18 or the switches 28 associated with the track controllers 26 of track segments 12a and 12c but may include a modified track controller 26' communicating with the bus 40 to receive information and transmit data on the bus 40 associated with sensors 25 on the track segment 12b being identical in function and layout to the sensors 25 on track segments 12a and 12b.

Instead of the driver coils 18, the track segment 12b will include one or more energy transfer coils 30 for wireless transfer of power to a pick-up coil 60 on the mover 16. Generally, the elimination of the driver coils 18 in track segment 12b and their associated circuitry in favor of the energy transfer coil 30 (and its associated circuitry) allows this track segment 12 to be lower in cost than track segments 12a and 12c. In addition, the elimination of the driver coils 18 allows a simplified placement of a power transmission coil 30 in the track segment 12b. Placing the power transmission coil 30 in this track also allows wireless energy transfer to be optionally added to any track 14 allowing better tailoring of the system to individual applications. This versatility is important because the ICT system 10 will be used in a variety of manufacturing applications only some of which will require wireless power transfer.

Referring still to FIG. 1, the sensors 25 on the track segment 12b allow the track controller 26' to sense and relay the position of the movers 16 as they passes over track segment 12b to adjacent track controllers 26 for seamless motion control (e.g., acceleration, deceleration and stopping) of the movers 16 as they cross between track segments 12 and further allows the activation of the energy transfer coil 30 only when movers 16 are present on track segment 12b for energy conservation.

The length of track segment 12b with respect to the length of the drive member (e.g., magnets 20) of the mover 16 will be set such that the drive member of the mover 16 is always engaged with driver coils 18 of one or both of the track segments 12a or 12c ensuring positive control of the mover 16 may be implemented. Also, in this regard, the pitch spatial phasing of the driver coils 18 in each of track segments 12a and 12c (the latter determined by the length of the track segment 12b) is set to match so that the mover 16 may electromagnetically engage with one or both of the track segments 12a and 12c without jumping or disruption despite the gap provided by the length of the intervening track segment 12b. In one embodiment, the length of the track segment 12b will be equal to an integer number of spacings 31 of the driver coils 18 on track segment 12a or 12b and preferably an integer number times the spacings 31 equal to the number of driver coils 18 forming a pole of the resultant linear motor.

Figure 2:
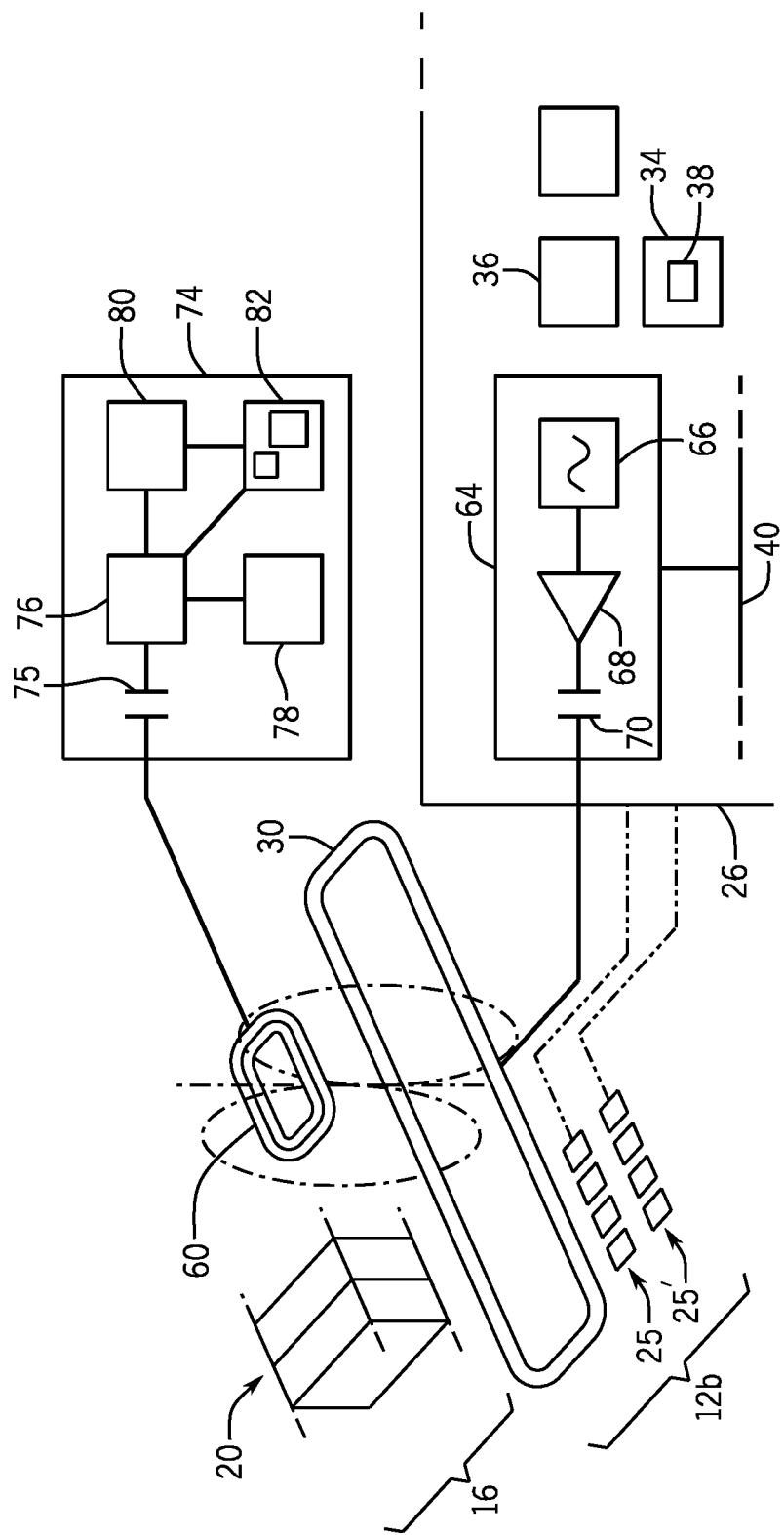
FIG. 2 is a simplified perspective view of an energy transfer coil on a track section and an associated pick-up coil on the mover and further showing associated energy transfer circuitry and energy extraction circuitry.

Referring now to FIG. 2, and as noted above, generally the mover 16 will include not only the drive member such as magnets 20 but a pick-up coil 60 typically having an axis (vertically as shown) parallel to the axis of the energy transfer coil 30. According to one aspect of the invention, the pick-up coil 60 and/or the coils 30 may be wound from a solid conductor or from Litz wire or maybe formed from a number of traces on one or more layers of a printed circuit board (PCB).

In this regard, the track controller 26' may include a drive circuit 64 providing power to the coil 30, for example, a sine wave AC signal per an internal oscillator 66 as amplified by amplifier 68. The operation of the drive circuit 64 may be controlled by signals over the data bus 40 to deactivate this circuit when a mover 16 is not present on track segment 12b. Generally the oscillator 66 will operate at a high frequency in excess of 10 kHz and typically in excess of 100 kHz.

The drive circuit 64 may be connected to the coil 30 through capacitor 70 to provide a series resonance with the inductance of the coil 30 at the frequency of the oscillator 66 for maximum energy transfer.

The track controller 26' (and each of the track controllers 26) may also receive sensor signals from a second redundant set of sensors 25' as required by some types of application (e.g., SIL standards). The signals from these two sets of sensors 25 and 25' are compared by the central controller 42 to detect sensor failure and to move the system to a safety state, for example, by stopping the movers 16.

The pick-up coil 60 similarly connects to an energy extraction circuit 74 on the mover 16 and may receive an electrical signal from the pick-up coil 60 through capacitor 75 providing a series resonant circuit with the inductance of pick-up coil 60 to the same frequency of the drive circuit 64 provided by oscillator 66. In this way the pick-up coil 60 may receive power wirelessly from the track segment 12b.

The energy extraction circuit 74 may include a power converter 76 configured to receive the AC voltage induced on the pick-up coil 60 as an input and to provide a second voltage as an output. The power converter may include, for example, diodes arranged as a passive full-wave rectifier to convert the AC voltage to a DC voltage. The power converter 76 may also include an output capacitance (not shown) in order to reduce a ripple present on the DC voltage from rectification. Alternatively or in addition, the power converter 76 may include or be made up entirely by a voltage regulator operating directly on an AC signal or configured to receive the rectified DC voltage or the AC voltage induced in the pick-up coil 60 as an input and supply one or more constant DC voltages for use by other devices on the energy extraction circuit 74.

The energy extraction circuit 74 may further include an energy storage device 78, such as a storage capacitor or battery to store energy received at the pick-up coil 60. During periods of time when the energy received via the pick-up coil 60 exceeds the energy required by the electronic devices on the energy extraction circuit 74, the power converter 76 may supply energy to the energy storage device 78. During periods of time when the energy received via the pick-up coil 60 is less than the energy required by the electronic devices on the energy extraction circuit 74, the power converter 76 may draw stored energy from the energy storage device 78.

It is contemplated that the energy received by the pick-up coil may be used to energize at least one power-consuming device 80 mounted on the mover 16. The power-consuming device 80 may be part of circuit energy extraction circuit 74, external from the circuit energy extraction circuit 74, or a combination thereof. The power-consuming device 80 will be selected according to the application requirements but may include, for example, an indicator providing a status of operation on the mover 16, an actuator interacting with a product on the mover, a sensor providing a status, such as the presence or absence, of a product on the mover, and the like. Sensors may be provided that, for example, detect vibration or temperature on the mover 16. The energy harvested by the pick-up coil 60 may provide for advanced analytics, condition monitoring, or safety applications to be incorporated in the linear drive system as a result of the wireless energy transfer between the energy transfer coils 30 and the pick-up coil 60.

It is further contemplated that a control circuit 82 may be required to control operation of the power-consuming device 80. The control circuit 82 may be a series of discrete logic devices implementing combinatorial logic, a processor operative to execute instructions stored in memory, or a combination thereof. The control circuit 82 may receive one or more inputs corresponding to an operating status of the mover, a product on the mover, or of the controlled process with which the mover is interacting and may generate one or more outputs to an actuator to achieve a desired performance in response to the inputs.

The power-consuming device(s) 80 may further include a wireless transmitter or transceiver operative to transmit information from the control circuit 82 to a receiver or second transceiver mounted on the track segment 12b, adjacent to the track, in the system central controller 42, or to any other suitable location according to the application requirements. The transmitter may communicate via a radio frequency (RF) signal, infrared signal, or via any other wireless communication medium as would be understood in the art.

In the following embodiments, the size of the pick-up coil 60 will be adjusted to provide good flux coupling with the coil 30 throughout the range of travel and generally, for this purpose, the length along the track segment 12b of the one of the pick-up coil 60 and coil 30 may be much longer than the other of the coil 30 and pick-up coil 60 (for example, at least twice as long as the shorter coil) to provide a more constant and continuous coupling as the mover 16 moves over at least one portion of the a track segment 12.

Referring now to FIG. 3, in a first embodiment, the pick-up coil 60 on the mover 16 may be wrapped around the outer periphery of the magnets 20 (or the other drive member) to provide a length along the track 14 that spans multiple energy transfer coils 30 so that there is always one energy transfer coil 30 electrically coupling with the pick-up coil 60 to provide energy transfer thereto. In this embodiment, it is beneficial that the phase of the signals in energy transfer coils 30 be identical such as may be accomplished by means of a timing signal communicating synchronization signals through the data bus 40 between oscillators 66, for example, using a phase locked loop or the like.

Referring now to FIG. 4, in an alternative embodiment, the pick-up coil 60 may overlap in a vertical direction with the magnets 20 which may serve to concentrate flux from the energy transfer coils 30 into the pick-up coil 60 by providing a high permeability backing material. The track 14 may otherwise be identical to that described above with respect to FIG. 3.

Referring now to FIG. 5, in a third embodiment, the pick-up coil 60 may be displaced with respect to the magnets 20 on the mover 16 to one longitudinal end of the mover 16. In addition or alternatively, the length of the pick-up coil 60 may be reduced so as to overlap at any given time with only a single energy transfer coil 30 on the track 14. In this way, phasing of the oscillators 66 of different track segments 12b need not be identical, simplifying their construction. Interruption of power when the energy transfer coils 30 and pick-up coil 60 are not aligned may be accommodated through the energy storage devices 78 of FIG. 2 or by increasing the longitudinal length of the pick-up coil 60 by an amount just less than the total length of track segments 12a (or 12c) and 12b.

Referring to FIG. 6, the ability to avoid the need to match the phase is of the oscillators 66 while providing continuous or near continuous power may be provided by using two pick-up coils 60 and displacing them from each other, for example, to the longitudinal ends of the magnets 20 to provide a first and second independent pick-up coil 60 that may simultaneously or individually provide power coupling. It will be appreciated by appropriate extension of the length of the pick-up coil 60 this power coupling can be continuous. In this case, the power from pick-up coils 60a and 60b may be combined only after the power converter 76 so that DC signals are combined, the DC signals being phase indifferent.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for wireless energy transfer in an independent cart system, the apparatus comprising:
   a track assembly having a plurality of track segments, wherein:
   a first track segment includes:
   drive coils mounted along a length of the first track segment,
   a plurality of electrical switches for controlling current to the drive coils, and
   a first controller to control the plurality of electrical switches, and wherein the first track segment does not include an energy transfer coil,
   a second track segment includes an energy transfer coil and a second controller, wherein the second track segment does not include a drive coil, the plurality of track segments includes a plurality of first track segments and a plurality of second track segments, and at least one second track segment is positioned between two first track segments;

a plurality of movers operative to travel along the track, each of the plurality of movers comprising:

a drive member, and a pick-up coil mounted for electrical interaction with the energy transfer coil when a given mover is aligned with a given second track segment;

wherein the first controller in each of the first track segments controls the plurality of electrical switches to provide current to respective drive coils to generate electromagnetic fields which engage the drive member to propel each of the plurality of movers along the track, and wherein each of the second track segments includes an energy transfer circuit providing current to the energy transfer coil to transfer electrical energy through mutual inductance to the pick-up coil of each of the plurality of movers.

2. The apparatus of claim 1 wherein the first and second track segments provide laterally opposed mover support surfaces perpendicular to a motion of the movers and engaging rollers on the movers and wherein the drive coils and energy transfer coils are positioned between lateral support surfaces.

3. The apparatus of claim 1 wherein the first and second track segments provide releasable interconnections for attaching and releasing the first and second track segments to other first and second track segments.

4. The apparatus of claim 1 wherein the first and second track segments further include mover position sensors detecting a position of the movers on the first and second track segments.

5. The apparatus of claim 4 wherein the first and second track segments further include a first and second redundant set of mover sensors each detecting a position of the movers on the first and second track segments to provide two independent mover position signals for a given mover.

6. The apparatus of claim 1 wherein the energy transfer coil and pick-up coils differ in extent along a length of the track by at least two times a length of the shorter coil.

7. The apparatus of claim 1 wherein the energy transfer coil and pick-up coil align to provide energy transfer only when a mover is over a portion of a given track less than the length of the given track.

8. The apparatus of claim 1 wherein the drive member is a magnet array and the pick-up coil extends a length of the magnet array measured along a direction of mover motion.

9. The apparatus of claim 1 wherein the pick-up coil is displaced along the mover away from the drive member to an end of the drive member.

10. The apparatus of claim 1 wherein the plurality of movers include a first pick-up coil and a second pick-up coil mounted for mutually exclusive electrical interaction with a given energy transmission coil.

11. A method of wireless energy transfer in an independent cart system, wherein the independent cart system includes a plurality of track segments and a plurality of movers operative to travel along the track, the method comprising the steps of:

providing a plurality of first track segments, wherein each of the first track segments includes drive coils mounted along a length of the first track segment, a plurality of electrical switches for controlling current to the drive coils, and a first controller to control the plurality of electrical switches;

providing a plurality of second track segments, wherein each of the plurality of second track segments includes an energy transfer coil and does not include a drive coil, wherein at least one of the plurality of second track segments is positioned between two first track segments;

providing the plurality of movers operative to travel along the track, wherein each of the plurality of movers has a drive member and a pick-up coil mounted for electrical interaction with the energy transfer coil when a given mover is aligned with a given second track portion;

applying current to the drive coils to generate electromagnetic fields which engage the drive member to propel each mover along the track, and applying current to the energy transfer coil to transfer electrical energy through mutual inductance to the pick-up coil of the movers.

12. The method of claim 11 wherein the first and second track segments provide laterally opposed mover support surfaces perpendicular to a motion of the movers and engaging rollers on the movers and wherein the drive coils and energy transfer coils are positioned between lateral support surfaces.

13. The method of claim 11 wherein the first and second track segments provide releasable interconnections for attaching and releasing the first and second track segments to other first and second track segments.

14. The method of claim 11 wherein the first and second track segments further include mover position sensors, the method further comprising the steps of:

detecting a position of the movers on the first and second track segments;

sensing the movers as they move over the first and second track segments; and controlling the drive coils according to the sensing.

15. The method of claim 14 wherein the first and second track segments further include a first and second redundant set of mover sensors, the method further comprising the steps of:

detecting a position of the movers on the track portion with the first and second redundant set of mover sensors to provide two independent mover position signals for a given mover; and comparing the two independent mover position signals to detect a sensor failure.

16. The method of claim 11 wherein the energy transfer coil and pick-up coils differ in extent along a length of the track by at least two times a length of the shorter coil.

17. The method of claim 11 wherein the energy transfer coil and pick-up coil align to provide energy transfer only when a mover is over a portion of a given track less than the length of the given track.

18. The method of claim 11 wherein the drive member is a magnet array and the pick-up coil extends a length of the magnet array measured along a direction of mover motion.

19. The method of claim 11 wherein the pick-up coil is displaced along the mover away from the drive member to an end of the drive member.

20. An apparatus for wireless energy transfer in an independent cart system, the apparatus comprising:

a track assembly having a plurality of track segments, wherein:

a first track segment includes drive coils mounted along a length of the first track segment at a given periodicity, the drive coils extending laterally to define a drive coil width across the track with respect to the track and wherein the first track segment does not include an energy transfer coil, a second track segment includes a gap portion along the track greater in length than the given periodicity and free from drive coils, the gap portion holding an energy transfer coil within the drive coil width, the plurality of track segments includes a plurality of first track segments and a plurality of second track segments, and at least one second track segment is positioned between two first track segments;

a plurality of movers operative to travel along the track, each of the plurality of movers comprising:

a drive member, and a pick-up coil mounted for electrical interaction with the energy transfer coil during movement over the track;

wherein each first track segment further includes respective drive circuits providing current to respective drive coils to generate electromagnetic fields which engages the drive member to propel each of the plurality of movers along the track, and each second track segment further includes energy transfer circuits providing current to the energy transfer coil to transfer electrical energy through mutual inductance to pick-up coils of the movers.

* * * * *